(12) United States Patent
Cho et al.

(10) Patent No.: US 11,763,255 B2
(45) Date of Patent: *Sep. 19, 2023

(54) COMPUTERIZED SYSTEMS AND METHODS FOR MANAGING INVENTORY BY GRADING RETURNED PRODUCTS

(71) Applicant: Coupang Corp., Seoul (KR)

(72) Inventors: Sungwon Cho, Suwon (KR); Jong Woon Bae, Incheon (KR); Ha Dong Kang, Seoul (KR)

(73) Assignee: Coupang Corp., Seoul (KR)

(*) Notice: Subject to any disclaimer, the term of this patent is extended or adjusted under 35 U.S.C. 154(b) by 136 days.

This patent is subject to a terminal disclaimer.

(21) Appl. No.: 17/372,578

(22) Filed: Jul. 12, 2021

(65) Prior Publication Data
US 2022/0245569 A1 Aug. 4, 2022

Related U.S. Application Data

(63) Continuation of application No. 17/162,011, filed on Jan. 29, 2021, now Pat. No. 11,087,278.

(51) Int. Cl.
- *G06T 7/00* (2017.01)
- *G06Q 10/087* (2023.01)
- *G06F 16/901* (2019.01)

(52) U.S. Cl.
CPC ......... *G06Q 10/087* (2013.01); *G06F 16/901* (2019.01); *G06T 7/0004* (2013.01)

(58) Field of Classification Search
CPC ............. G06Q 10/087; G06Q 10/0837; G06Q 10/0633; G06Q 10/0832; G06Q 10/08345; G06F 16/901; G06T 7/0004
See application file for complete search history.

(56) References Cited

U.S. PATENT DOCUMENTS 7,389,294 B2 * 6/2008 Kotas ..................... G06Q 30/02
   705/28
7,617,133 B1 * 11/2009 Antony .............. G06Q 30/0631
   705/28
(Continued)

FOREIGN PATENT DOCUMENTS

JP  2002-259553 A  9/2002
JP  2020-079995    5/2020
(Continued)

OTHER PUBLICATIONS

International Search Report and Written Opinion dated Oct. 25, 2021 in counterpart PCT International Application No. PCT/IB2021/051656, 6 pages.

(Continued)

*Primary Examiner* — Aaron W Carter
(74) *Attorney, Agent, or Firm* — Finnegan, Henderson, Farabow, Garrett & Dunner, LLP

(57) ABSTRACT

Systems and method are provided for managing inventory by determining grading returned products. One method includes, generating a hierarchical model based on the return product identifier, the hierarchical model comprising a plurality of data structures; and generating an agent configured to traverse the plurality of data structures of the hierarchical model. The method may further include determining a price of the product based on a product condition; modifying the database to assign the price to the return product identifier; transmitting a notification, to the user device, to resell the product at the determined price; and providing, for presentation via the user device, a user interface that includes the notification.

20 Claims, 14 Drawing Sheets

(56) References Cited

U.S. PATENT DOCUMENTS

| | | | |
|---|---|---|---|
| 8,156,007 B1* | 4/2012 | Anthony | G06Q 99/00 |
| | | | 705/26.1 |
| 9,697,548 B1 | 7/2017 | Jaff et al. | |
| 10,268,984 B1 | 4/2019 | Ramoji et al. | |
| 10,332,209 B1* | 6/2019 | Brandmaier | G06Q 40/08 |
| 10,430,886 B1* | 10/2019 | Brandmaier | G06Q 40/08 |
| 10,504,061 B1* | 12/2019 | Shi | G06Q 10/0838 |
| 10,565,544 B1* | 2/2020 | Lee | G06Q 50/28 |
| 10,713,622 B1* | 7/2020 | Yin | G06Q 10/0875 |
| 10,726,490 B1 | 7/2020 | Broussard | G06F 40/166 |
| 11,087,278 B1* | 8/2021 | Cho | G06Q 10/087 |
| 11,157,871 B1* | 10/2021 | Seol | G06Q 10/087 |
| 11,176,516 B1* | 11/2021 | Cho | G06Q 30/0641 |
| 2002/0019785 A1 | 2/2002 | Whitman | |
| 2002/0032612 A1 | 3/2002 | Williams | |
| 2003/0135432 A1* | 7/2003 | McIntyre | G06Q 10/087 |
| | | | 705/28 |
| 2003/0233246 A1 | 12/2003 | Snapp | |
| 2004/0267642 A1 | 12/2004 | Stenz et al. | |
| 2006/0149577 A1 | 7/2006 | Stashluk et al. | |
| 2007/0185775 A1* | 8/2007 | Lawton | G06Q 50/188 |
| | | | 705/26.8 |
| 2009/0307110 A1 | 12/2009 | Betzler et al. | |
| 2012/0022938 A1 | 1/2012 | McNea et al. | |
| 2012/0084119 A1 | 4/2012 | Vandehey et al. | |
| 2013/0085889 A1 | 4/2013 | Fitting et al. | |
| 2016/0132893 A1 | 5/2016 | Bisges et al. | |
| 2017/0124511 A1 | 5/2017 | Mueller et al. | |
| 2017/0193430 A1 | 7/2017 | Barreira Avegliano et al. | |
| 2017/0364860 A1* | 12/2017 | Wilkinson | G06Q 30/0255 |
| 2018/0144301 A1 | 5/2018 | Engel et al. | |
| 2018/0204296 A1* | 7/2018 | Gildein, II | G06Q 50/163 |
| 2018/0365278 A1* | 12/2018 | Klöhn | G06F 16/51 |
| 2019/0213573 A1 | 7/2019 | Zelten et al. | |
| 2020/0065791 A1* | 2/2020 | Patil | G07G 1/0063 |
| 2020/0364676 A1* | 11/2020 | Manmohan | G06Q 10/0837 |
| 2021/0012280 A1 | 1/2021 | Paquin et al. | |
| 2021/0012281 A1 | 1/2021 | Paquin et al. | |
| 2021/0241225 A1* | 8/2021 | Rehn | G06Q 10/0833 |
| 2022/0222680 A1* | 7/2022 | Qi | G06Q 10/08 |
| 2022/0245569 A1* | 8/2022 | Cho | G06T 7/0004 |

FOREIGN PATENT DOCUMENTS

| | | |
|---|---|---|
| KR | 10-2010-0125114 | 11/2010 |
| KR | 10-1869895 B1 | 6/2018 |
| KR | 10-2020-0145256 | 12/2020 |

OTHER PUBLICATIONS

International Search Report and Written Opinion, dated Oct. 25, 2021, issued in International Patent Application No. PCT/IB2021/051656 (8 pages).

Notice of Preliminary Rejection in counterpart Korean Application No. 10-2021-0149229 dated Aug. 12, 2022 (18 pages, translation included).

* cited by examiner

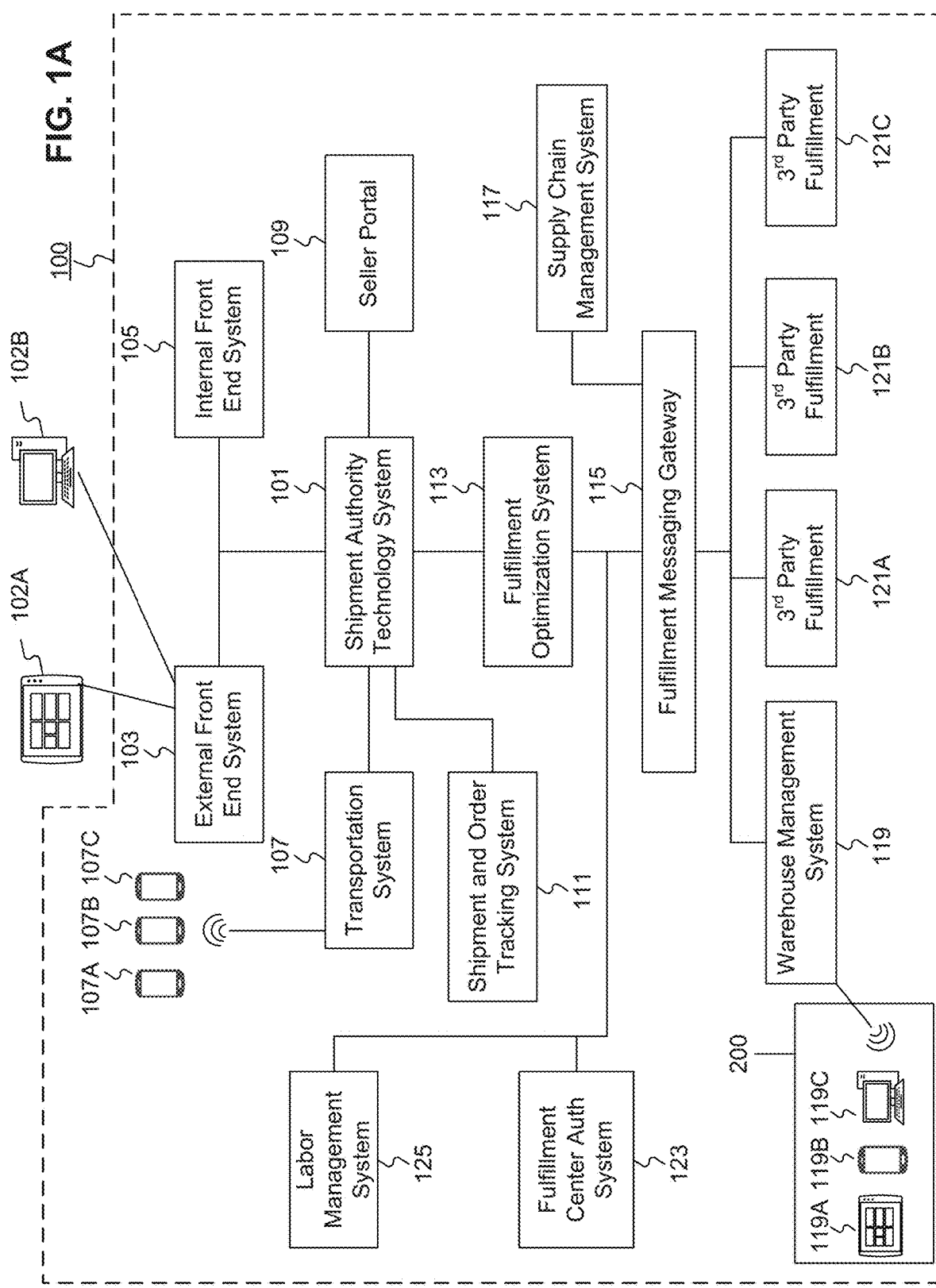

COMPUTERIZED SYSTEMS AND METHODS FOR MANAGING INVENTORY BY GRADING RETURNED PRODUCTS

CROSS-REFERENCE TO RELATED APPLICATIONS

This application is a continuation of and claims the benefit of priority to U.S. application Ser. No. 17/162,011, filed Jan. 29, 2021 (now allowed), the contents of which are hereby incorporated herein by reference.

TECHNICAL FIELD

The present disclosure generally relates to computerized systems and methods for managing inventory by grading returned products. In particular, embodiments of the present disclosure relate to inventive and unconventional systems that may automatically determine a price of a product based on the product condition by generating a hierarchical model including a plurality of data structures and traversing the plurality of data structures.

BACKGROUND

The sale of returned products may be as important as the sale of new products for many organizations. The sale of any product may be difficult or impossible if it is listed at a price that is inconsistent with the true value of the product. Return processing is costly to organizations in two ways. The first type of cost relates to shipping and handling costs. The process of reversing an online order has many steps and includes the cost of the delivery as well as the many touches and indicia scans (e.g., of barcodes), each of which comes with a labor cost, to move a return item back into inventory stored in fulfillment centers. It is inevitable that the expense will reduce profit margins. The second type of cost is more difficult to quantify, but the longer a return item stays out of circulation and is unable to be sold, the less value it has which results in a loss for the retailer. This second type of cost may also apply to new products that have never been sold.

Conventional inventory management systems transfer a return item without defects from a return center storing the return item to a fulfillment center for resale at the original price. For example, these conventional computerized systems may only rely on the original price or an arbitrary discount to assign a price to returned products or products that have been stored in a fulfillment center for a long time. These computerized systems are too strict and inconsistent, resulting in new prices that are not consistent with the true value of the products.

Therefore, there is a need for improved methods and systems for managing inventory by grading returned products.

SUMMARY

One aspect of the present disclosure is directed to a system for managing inventory by grading returned products. The system may include a memory storing instructions and at least one processor configured to execute instructions. The instructions may include receiving, from a user device, a return product identifier and a request for grading a product; generating a hierarchical model based on the return product identifier, the hierarchical model comprising a plurality of data structures; and generating an agent configured to traverse the plurality of data structures of the hierarchical model. Traversing the plurality of data structures may include: at a first data structure: scanning, via a worker device, an indicia of the product; based on the scanned indicia, searching a database for product information associated with the product and identifying the product information associated with the product; based on the product information, retrieving at least one first prompt from the database; and modifying the database to assign, to the return product identifier, at least one response to the first prompt based on the scanned indicia. The instructions may further include, at a second data structure: scanning, via a worker device, the indicia of the product; based on the scanned indicia, searching the database for product information associated with the product and identifying the product information associated with the product; based on the product information, retrieving at least one second prompt from the database; transmitting the second prompt to the worker device; submitting, via the worker device, at least one response to the second prompt; and modifying the database to assign, to the return product identifier, at least one response to the second prompt. The instructions may further include, at a third data structure: determining a product condition associated with the product; and assigning the product condition to the return product identifier. The instructions may further include determining a price of the product based on the product condition; modifying the database to assign the price to the return product identifier; transmitting a notification, to the user device, to resell the product at the determined price; and providing, for presentation via the user device, a user interface that includes the notification.

Another aspect of the present disclosure is directed to a method for managing inventory by grading returned products. The method may include receiving, from a user device, a return product identifier and a request for grading a product; generating a hierarchical model based on the return product identifier, the hierarchical model comprising a plurality of data structures; and generating an agent configured to traverse the plurality of data structures of the hierarchical model. Traversing the plurality of data structures may include: at a first data structure: scanning, via a worker device, an indicia of the product; based on the scanned indicia, searching a database for product information associated with the product and identifying the product information associated with the product; based on the product information, retrieving at least one first prompt from the database; and modifying the database to assign, to the return product identifier, at least one response to the first prompt based on the scanned indicia. The method may further include, at a second data structure: scanning, via a worker device, the indicia of the product; based on the scanned indicia, searching the database for product information associated with the product and identifying the product information associated with the product; based on the product information, retrieving at least one second prompt from the database; transmitting the second prompt to the worker device; submitting, via the worker device, at least one response to the second prompt; and modifying the database to assign, to the return product identifier, at least one response to the second prompt. The method may further include, at a third data structure: determining a product condition associated with the product; and assigning the product condition to the return product identifier. The method may further include determining a price of the product based on the product condition; modifying the database to assign the price to the return product identifier;

transmitting a notification, to the user device, to resell the product at the determined price; and providing, for presentation via the user device, a user interface that includes the notification.

Yet another aspect of the present disclosure is directed to a system for managing inventory by grading returned products. The system may include a memory storing instructions and at least one processor configured to execute instructions. The instructions may include receiving, from a user device, a simulated return product identifier and a simulated request for grading a product; generating a hierarchical model based on the simulated return product identifier, the hierarchical model comprising a plurality of data structures; and generating an agent configured to traverse the plurality of data structures of the hierarchical model. Traversing the plurality of data structures may include, at a first data structure: scanning, via a worker device, an indicia of the product; based on the scanned indicia, searching a database for product information associated with the product and identifying the product information associated with the product; based on the product information, retrieving at least one first prompt from the database; and modifying the database to assign, to the return product identifier, at least one response to the first prompt based on the scanned indicia. The instructions may further include, at a second data structure: scanning, via a worker device, the indicia of the product; based on the scanned indicia, searching the database for product information associated with the product and identifying the product information associated with the product; based on the product information, retrieving at least one second prompt from the database; transmitting the second prompt to the worker device; submitting, via the worker device, at least one response to the second prompt; and modifying the database to assign, to the return product identifier, at least one response to the second prompt. The instructions may further include, at a third data structure: determining a product condition associated with the product; and assigning the product condition to the return product identifier. The instructions may further include determining a price of the product based on the product condition; modifying the database to assign the price to the return product identifier; transmitting a notification, to the user device, to resell the product at the determined price; and providing, for presentation via the user device, a user interface that includes the notification. The instructions may further include performing a validation test on the determined price; based on a determination that the determined price passes the validation test, applying the hierarchical model to real return product identifiers and real requests; and based on a determination that the determined price does not pass the validation test, modifying the hierarchical model by modifying at least one data structure or at least one connection between two data structures.

Other systems, methods, and computer-readable media are also discussed herein.

BRIEF DESCRIPTION OF THE DRAWINGS

FIG. 1A is a schematic block diagram illustrating an exemplary embodiment of a network comprising computerized systems for communications enabling shipping, transportation, and logistics operations, consistent with the disclosed embodiments.

DETAILED DESCRIPTION

Figure 1B:
FIG. 1B depicts a sample Search Result Page (SRP) that includes one or more search results satisfying a search request along with interactive user interface elements, consistent with the disclosed embodiments.
Figure 1C:
FIG. 1C depicts a sample Single Display Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for managing inventory by grading returned products. The disclosed embodiments are capable of receiving a return product identifier and a request for grading a product from a user device associated with a user. In some embodiments, a request for grading a product may be automatically transmitted to a grading system when a user device scans an indicia of the product. The grading system may generate a hierarchical model based on the return product identifier. In some embodiments, a user may generate or modify a hierarchical model via an internal user device. In some embodiments, the grading system may generate a hierarchical model by determining a hierarchy of parameters associated with a product based on the return product identifier.

The grading system may generate an agent configured to traverse the plurality of data structures of the hierarchical model. The hierarchical model may include a plurality of data structures, where the data structures may be application programming interface (API) nodes. At API nodes, the grading system may prompt a worker to scan, via a worker device, an indicia of a product. The grading system may search a database for product information associated with the product based on the scanned indicia and identify the product information associated with the product. In some embodiments, the grading system may retrieve at least one first prompt from a database based on the product information and modify the database to assign, to the return product identifier, at least one response to the first prompt based on the scanned indicia.

In some embodiments, the agent may traverse a plurality of data structures that may be classification nodes. In some embodiments, the grading system may generate one or more classification nodes. The sequence and number of nodes may vary based on the hierarchical model or return product identifier. In some embodiments, one or more classification nodes that are dependent on an API node may populate the hierarchical model when the API node is generated. In some embodiments, classification nodes that are dependent on the API node may populate when a worker device scans an indicia of a product.

For example, at a classification node, the grading system may retrieve at least one prompt conditional decision prompt from a database based on the product information associated with the product. In some embodiments, the grading system may prompt a worker associated with a worker device to scan, via the worker device, an indicia of the product. The grading system may search a database for product information associated with the product based on the scanned indicia and identify the product information associated with the product. The grading system may retrieve at least one prompt from a database based on the product information associated with the product. In some embodiments, the grading system may transmit the prompt to the worker device. A user may submit via a user device at least one response to the prompt. The grading system may modify database to assign, to the return product identifier, at least one response submitted by the user.

The grading system may generate a node at which a product condition associated with the product may be determined. The grading system may transmit the determined product condition to a price determination system and the price determination system may determine a price of the product based on the product condition. In some embodiments, the grading system may determine a price of the product based on the product condition. The grading system may modify a database to assign the price to the return product identifier and transmit a notification to a user device to resell the returned product at the determined price. The grading system may provide a user interface that includes the notification for presentation via a user device.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
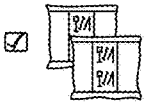
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where system 100 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfillment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfillment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

$3^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMS 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
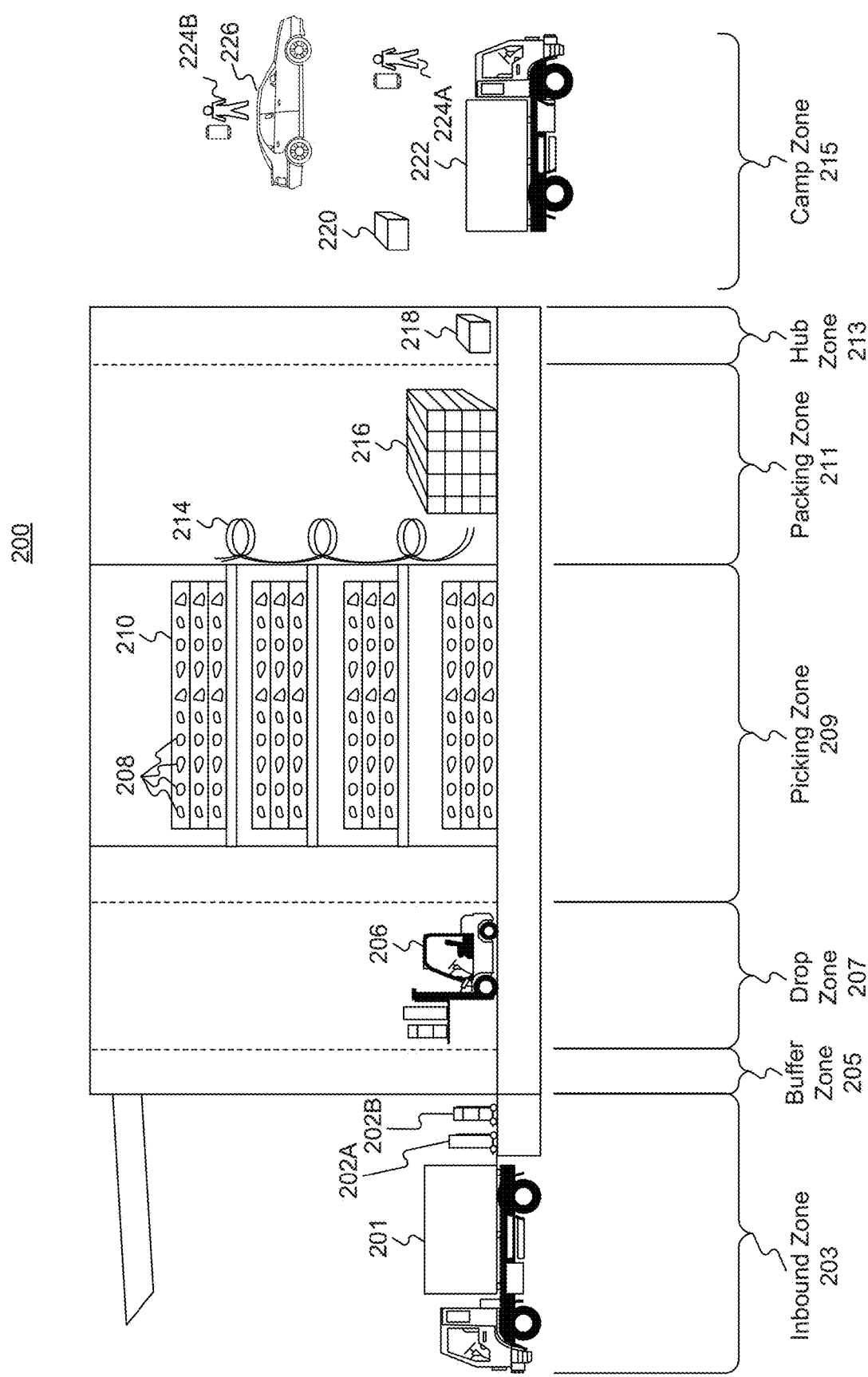
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
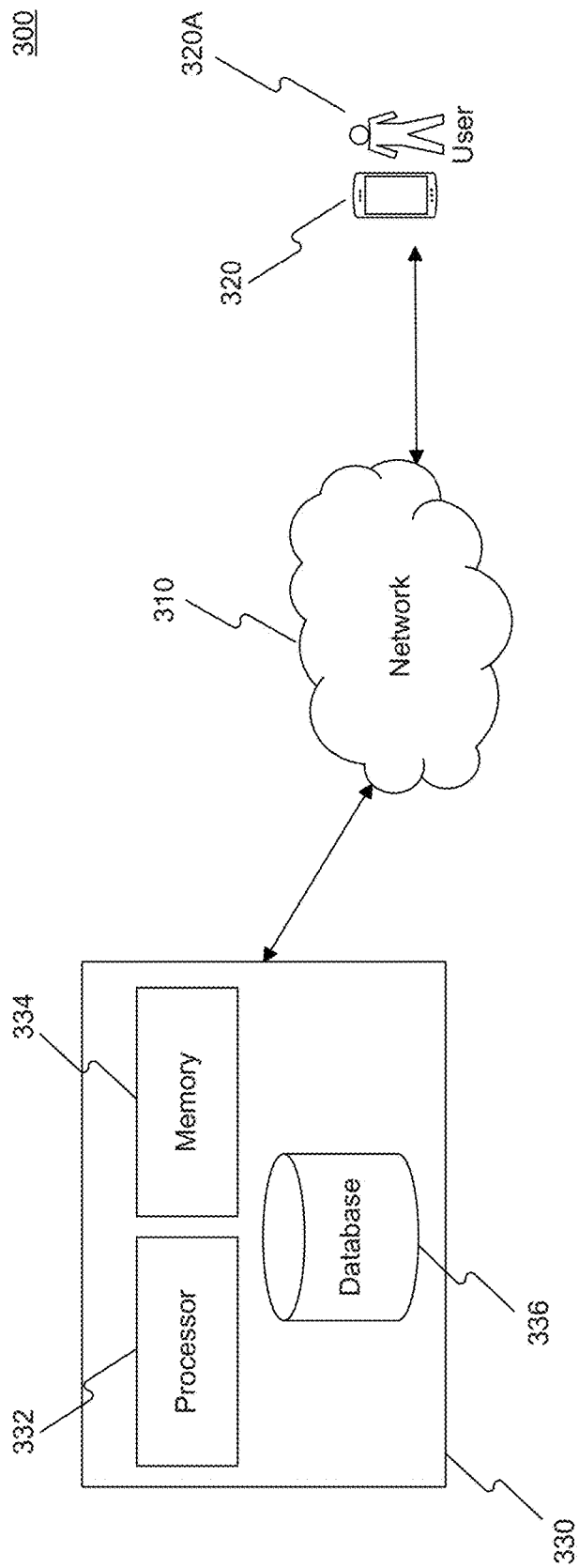
FIG. 3 depicts an exemplary network of devices and systems automatically managing inventory by grading returned products, consistent with the disclosed embodiments.

Referring to FIG. 3, an exemplary network of devices and systems for managing inventory by grading returned products is shown. As illustrated in FIG. 3, a system 300 may include a grading system 330, which may communicate with a user device 320 associated with a user 320A via a network 310. In some embodiments, grading system 330 may communicate with the other components of system 300 via a direct connection, for example, using a cable. In some other embodiments, system 300 may be a part of system 100 of FIG. 1A and may communicate with the other components of system 100 via network 310 or via a direct connection, for example, using a cable. Grading system 330 may comprise a single computer or may each be configured as a distributed computer system including multiple computers that interoperate to perform one or more of the processes and functionalities associated with the disclosed examples.

As shown in FIG. 3, grading system 330 may comprise a processor 332, a memory 334, and a database 336. Processor 332 may be one or more known processing devices, such as a microprocessor from the Pentium™ family manufactured by Intel™ or the Turion™ family manufactured by AMD™. Processor 332 may constitute a single core or multiple core processor that executes parallel processes simultaneously. For example, processor 332 may use logical processors to simultaneously execute and control multiple processes. Processor 332 may implement virtual machine technologies or other known technologies to provide the ability to execute, control, run, manipulate, store, etc. multiple software processes, applications, programs, etc. In another example, processor 332 may include a multiple-core processor arrangement configured to provide parallel processing functionalities to allow grading system 330 to execute multiple processes simultaneously. One of ordinary skill in the art would understand that other types of processor arrangements could be implemented that provide for the capabilities disclosed herein.

Memory 334 may store one or more operating systems that perform known operating system functions when executed by processor 332. By way of example, the operating system may include Microsoft Windows, Unix, Linux, Android, Mac OS, iOS, or other types of operating systems. Accordingly, examples of the disclosed invention may operate and function with computer systems running any type of operating system. Memory 334 may be a volatile or non-volatile, magnetic, semiconductor, tape, optical, removable, non-removable, or other type of storage device or tangible computer readable medium.

Database 336 may include, for example, Oracle™ databases, Sybase™ databases, or other relational databases or non-relational databases, such as Hadoop™ sequence files, HBase™, or Cassandra™. Database 336 may include computing components (e.g., database management system, database server, etc.) configured to receive and process requests for data stored in memory devices of the database(s) and to provide data from the database(s). Database 336 may include NoSQL databases such as HBase, MongoDB™ or Cassandra™. Alternatively, database 336 may include relational databases such as Oracle, MySQL and Microsoft SQL Server. In some embodiments, database 336 may take the form of servers, general purpose computers, mainframe computers, or any combination of these components.

Database 336 may store data that may be used by processor 332, respectively, for performing methods and processes associated with disclosed examples. Database 336 may be located in grading system 330 as shown in FIG. 3, or alternatively, it may be in external storage devices located outside of grading system 330. Data stored in 336 may include any suitable data associated with products (e.g., hierarchical models associated with products, parameters, hierarchy of parameters, data structures or nodes associated with products, prompts associated with data structures or nodes, responses associated with data structures or nodes, product price, product category, expiration date of product, customer relationship with vendor of product, product damage, type of fulfillment center that received a product, age of product, condition of product, status from return center, assignments to return product identifiers associated with products, historical data of products, the original price of products, discounts to be applied to products, validation test conditions, validation test results, etc.).

User device 320 may be a tablet, mobile device, computer, or the like. User device 320 may include a display. The display may include, for example, liquid crystal displays (LCD), light emitting diode screens (LED), organic light emitting diode screens (OLED), a touch screen, and other known display devices. The display may show various information to a user. For example, it may display a user interface element, which includes an option to scan an indicia (e.g., a barcode, an image, a text string, an RFID tag, or the like) of a product or returned product (e.g., items 202A or 202B of FIG. 2), submit a request for grading a product, generate a hierarchical model, modify a hierarchical model, identify product information associated with a product, retrieve prompts associated with data structures of a hierarchical model, transmits prompts to user or worker devices (e.g., user device 320), modify database 336 to assign at least one response to a prompt to a return product identifier, submit a request for assigning a product price to a product, submit a selection of a product or return product identifier, submit a pickup request to pick up a returned product from a return center and deliver the returned product to FC 200, submit a request to list a product for sale (e.g., at a new price), etc. In some embodiments, the display may show current or historical data of the product (e.g., hierarchical models associated with products, parameters, hierarchy of parameters, data structures or nodes associated with products, prompts associated with data structures or nodes, responses associated with data structures or nodes, product price, product category, expiration date of product, customer relationship with vendor of product, product damage, type of fulfillment center that received a product, previous sales of the product or related products, previous conditions of the product and whether it was sold at the conditions, the price or discount at which the product was sold and the condition associated with the product for that sale, previous inventory rates of the product and whether it was sold at the inventory rates, the price or discount at which the product was sold and the inventory rate associated with the product for that sale, age of product, assignments to return product identifiers associated with products, historical data of products, the original price of products, discounts to be applied to products, validation test conditions, validation test results, status from return center, assignments to return product identifiers associated with products, original prices of products, listings of products for sale, etc.).

User device 320 may include one or more input/output (I/O) devices. The I/O devices may include one or more devices that allow user device 320 to send and receive information from user 320A or another device. The I/O devices may include various input/output devices, a camera, a microphone, a keyboard, a mouse-type device, a gesture sensor, an action sensor, a physical button, an oratory input, etc. The I/O devices may also include one or more communication modules (not shown) for sending and receiving information from price determination system 330 by, for example, establishing wired or wireless connectivity between user device 320 and network 310. In some embodiments, user device 320 may be devices 119A-119C of FIG. 1A associated with FC 200.

In some embodiments, user 320A may be an internal user (e.g., employees of an organization that owns, operates, or leases systems 100 or 300). Internal front end system 105 may be implemented as a computer system that enables user 320A to interact with system 300. For example, in embodiments where systems 100 or 300 enable the presentation of systems to enable users to scan an indicia of a product, submit a request for assigning a product price to a product or returned product, submit a request for grading a product, generate a hierarchical model, modify a hierarchical model, identify product information associated with a product, retrieve prompts associated with data structures of a hierarchical model, transmits prompts to user or worker devices (e.g., user device 320), modify database 336 to assign at least one response to a prompt to a return product identifier, submit a request for assigning a product price to a product, submit a selection of a product or return product identifier, submit a pickup request to pick up a returned product from a return center and deliver the returned product to FC 200, submit a request to list a product for sale (e.g., at a new price), submit a selection of a product or return product identifier, submit a pickup request to pick up a returned product from a return center and deliver the returned product to FC 200, or submit a request to list a product for sale, internal front end system 105 may be implemented as a web server that enables user 320A to view current and historical data of products (e.g., hierarchical models associated with products, parameters, hierarchy of parameters, data structures or nodes associated with products, prompts associated with data structures or nodes, responses associated with data structures or nodes, product price, product category, expiration date of product, customer relationship with vendor of product, product damage, type of fulfillment center that received a product, previous sales of the product or related products, previous conditions of the product and whether it was sold at the conditions, the price or discount at which the product was sold and the condition associated with the product for that sale, previous inventory rates of the product and whether it was sold at the inventory rates, the price or discount at which the product was sold and the inventory rate associated with the product for that sale, age of product, assignments to return product identifiers associated with products, historical data of products, the original price of products, discounts to be applied to products, validation test conditions, validation test results, status from return center, assignments to return product identifiers associated with products, original prices of products, listings of products for sale, etc.). In some embodiments, internal front end system 105 may run custom web server software designed to receive and process requests from systems or devices depicted in systems 100 or 300, acquire information from databases (e.g., database 336) and other data stores based on those requests, and provide responses to the received requests based on acquired information.

Grading system 330 may receive a return product identifier and a request for grading a product from user device 320 associated with a user 320A. In some embodiments, a request for grading a product may be automatically transmitted to grading system 330 when user device 320 scans an indicia of the product.

Grading system 330 may generate a hierarchical model based on the return product identifier. In some embodiments, user 320A may generate or modify a hierarchical model via an internal user device (e.g., user device 320). In some embodiments, grading system 330 may generate a hierarchical model by determining a hierarchy of parameters associated with a product based on the return product identifier. For example, the parameters may include one or more of product price, product category, expiration date of product, customer relationship with vendor of product, product damage, extent or degree of product damage, whether the product should be scrapped, whether a user changed their mind regarding a product, whether the product has defects, whether a user wants to exchange a product, manufacturer, SKU identification, whether the product is fresh food, type of fulfillment center that received the product, audit category, etc. In some embodiments, grading system 330 may arrange a plurality of data structures based on the hierarchy of parameters to generate the hierarchical model.

In some embodiments, grading system 330 may generate an agent configured to traverse the plurality of data structures of the hierarchical model. For example, an agent may be software including functions or methods configured to perform actions for traversing a plurality of data structures.

The hierarchical model may include a plurality of data structures, where the data structures may be application programming interface (API) nodes. At API nodes, grading system 330 may prompt a worker (e.g., user 320A) associated with a worker device (e.g., user device 320) to scan, via the worker device, an indicia (e.g., a barcode, an image, a text string, an RFID tag, etc.) of a product. Grading system 330 may search database 336 for product information associated with the product based on the scanned indicia and identify the product information associated with the product. In some embodiments, grading system 330 may retrieve at least one first prompt from database 336 based on the product information and modify database 336 to assign, to the return product identifier, at least one response to the first prompt based on the scanned indicia.

In some embodiments, the agent may sequentially traverse a plurality of API nodes. In some embodiments, the agent may traverse a plurality of data structures that may be classification nodes. In some embodiments, grading system 330 may generate one or more classification nodes. The sequence and number of nodes may vary based on the hierarchical model or return product identifier. In some embodiments, one or more classification nodes that are dependent on an API node may populate the hierarchical model when the API node is generated. In some embodiments, classification nodes that are dependent on the API node may populate when a worker device scans an indicia of a product.

For example, at a classification node, grading system 330 may retrieve at least one prompt conditional decision prompt from database 336 based on the product information associated with the product. In some embodiments, grading system 330 may prompt a worker associated with a worker device to scan, via the worker device, an indicia of the product. Grading system 330 may search database 336 for product information associated with the product based on the scanned indicia and identify the product information associated with the product. Grading system 330 may retrieve at least one prompt from database 336 based on the product information associated with the product. In some embodiments, grading system 330 may transmit the prompt to the worker device. User 320A may submit via user device 320 at least one response to the prompt. Grading system 330 may modify database 336 to assign, to the return product identifier, at least one response submitted by user 320A.

For example, grading system 330 may transmit a prompt that requests the physical state of the product. The prompt may offer one or more options, such as "no marks or blemishes," "blemish," "mark or scratch on package," "heavily damaged," etc. User 320A may submit one of the options offered by the prompt as response via user device 320. Grading system 330 may modify database 336 to assign, to the return product identifier, the response submitted by user 320A. Based on the response submitted by user 320A, the agent may traverse a subsequent node in the hierarchical model. In some embodiments, the subsequent node traversed may depend on the response submitted by user 320A. For example, if user 320A submits a response "blemish," then the subsequent node traversed may transmit a prompt that requests an indication of whether the blemishes may be removed from the product. User 320A may submit a response "yes" or "no" via user device 320. Grading system 330 may modify database 336 to assign, to the return product identifier, the response submitted by user 320A. Based on the response submitted by user 320A, the agent may traverse a subsequent node in the hierarchical model until the agent reaches a final node. For example, the final node may indicate a product's condition (e.g., the package of the product is unopened, new, repackaged, package damaged, refurbished, used best, used good, or used normal) or a type of material of the product (e.g., where the type of material of a product may indicate a recycling process for the product).

In some embodiments, if user 320A submits a response "mark or scratch on package," then the subsequent node traversed may be an API node at which grading system 330 may retrieve at least one image of the product associated with the return product identifier and at least one image of the product as advertised from database 336. In some embodiments, if user 320A submits a response "mark or scratch on package," then the subsequent node traversed may be an API node at which grading system 330 may retrieve at least one image of the product as advertised from database 336 and the node traversed after the API node may be a classification node at which grading system 330 may transmit a prompt that requests at least one image of the product associated with the return product identifier from user 320A. In some embodiments, grading system 330 may retrieve at least one image of the product as advertised without retrieving or receiving any images of the product associated with the return product identifier.

In some embodiments, when at least one image of the product as advertised is retrieved, grading system 330 may transmit a prompt to user device 320 that requests an indication of whether the package of the product is more or less damaged than shown in the at least one image of the product as advertised at a subsequent node traversed. In some embodiments, grading system 330 may transmit a request to user device 320 to inspect the product. In some embodiments, grading system 330 may transmit a request to user device 320 to inspect at least one image of the product associated with the return product identifier. In some embodiments, grading system 330 may provide, for presentation via user device 320, a user interface that includes the request to inspect the product. In some embodiments, grading system 330 may provide, for presentation via user device 320, a user interface that includes at least one image of the product or at least one image of the product as advertised. In some embodiments, the user interface may include a selectable interface element for inspecting at least one image of the product as compared to at least one image of the product as advertised.

In some embodiments, user 320A may submit a response including "more," "less," or "same" via user device 320. For example, grading system 330 may receive, from user device 320, an indication that the product is more damaged than depicted in the at least one image of the product as advertised, an indication that the product is less damaged than depicted in the at least one image of the product as advertised, or an indication that the product is in a condition similar to or the same as depicted in the at least one image of the product as advertised. Grading system 330 may modify database 336 to assign, to the return product identifier, the response submitted by user 320A. Based on the response submitted by user 320A, the agent may traverse a subsequent node in the hierarchical model until the agent reaches a final node.

In some embodiments, an API node or a classification node may include a prompt requesting an original price of a product. The node may include at least one branch leading to a subsequent node. For example, the agent may follow a branch to traverse a subsequent node if the original price is greater than a threshold price. In some embodiments, the agent may follow a branch to traverse a subsequent node if the original price is less than a threshold price. In some embodiments, the agent may follow a branch to traverse a subsequent node if there is no original price or if a default price is submitted. Grading system 330 may modify database 336 to assign, to the return product identifier, the response associated with an API node or submitted by user 320A for a classification node. Based on the response, the agent may traverse a subsequent node in the hierarchical model until the agent reaches a final node.

In some embodiments, grading system 330 may determine that a product condition is severely damaged (e.g., based on a response submitted by user 320A) and that the product is salvageable based on historical data stored in database 336. In some embodiments, grading system 330 may determine that a product condition is severely damaged or that the product is salvageable based on responses to nodes (e.g., API nodes, classification nodes, product type, product price, vendor, material, product damage condition, etc.). Grading system 330 may modify database 336 to assign responses to at least one node to the return product identifier, wherein the assigned responses indicate that the product is salvageable. In some embodiments, grading system 330 may determine that a product condition is severely damaged (e.g., based on a response submitted by user 320A) and that the product is not salvageable based on historical data stored in database 336. Grading system 330 may modify database 336 to assign responses to at least one node to the return product identifier, wherein the assigned responses indicate that the product is not salvageable.

In some embodiments, grading system 330 may generate a node at which a product condition associated with the product may be determined. A product condition may include unopened, new, repackaged, package damaged, refurbished, used best, used good, or used normal. In some embodiments, the node may be a final node that is traversed by the agent after the agent traverses all API nodes or classification nodes in the hierarchical model. In some embodiments, grading system 330 may automatically determine the product condition when the agent is triggered by a preceding node to traverse the final node. For example, the agent may automatically traverse the final node when user 320A submits at least one response to the prompt associated with a classification node. In some embodiments, grading system 330 may assign the product condition to the return product identifier.

In some embodiments, grading system 330 may transmit the determined product condition to a price determination system and the price determination system may determine a price of the product based on the product condition. In some embodiments, grading system 330 may determine a price of the product based on the product condition. Grading system 330 may modify database 336 to assign the price to the return product identifier and transmit a notification to user device 320 to resell the returned product at the determined price. Grading system 330 may provide a user interface that includes the notification for presentation via user device 320.

In some embodiments, grading system 330 may perform a validation test on the determined price. For example, grading system 330 may perform a validation test that includes comparing a determined price or product condition to a predetermined price or product condition. In some embodiments, a validation test may use historical data (e.g., product prices, product conditions, etc.) stored in database 336 or a hierarchical model to perform the validation test. In some embodiments, grading system 330 may modify validation tests based on past validation tests or modifications (e.g., user input) by internal users. In some embodiments, grading system 330 may apply the hierarchical model to real return product identifiers and real requests based on a determination that the determined price or product condition pass the validation tests. In some embodiments, grading system 330 may modify the hierarchical model by modifying at least one node or branch connection between two nodes based on a determination that the determined price or product condition do not pass the validation tests. In some embodiments, grading system 330 may receive a simulated return product identifier and a simulated request for grading a product from user device 320 associated with user 320A. In some embodiments, a simulated request for grading a product may be automatically transmitted to grading system 330 when user device 320 scans an indicia of the product.

In some embodiments, an internal user may generate or modify the hierarchical model via internal front end system 105. In some embodiments, grading system 330 may track different versions of hierarchical models. In some embodiments, internal users or grading system 330 may choose a hierarchical model to validate or implement on real-time products by choosing or modifying a specific version of a hierarchical model. For example, the types of parameters, number of parameters, or distances between nodes in the hierarchical model may be modified. In some embodiments, new parameters may be generated by grading system 330. In some embodiments, default values may be generated, modified, or assigned to parameters. For example, some parameters may have a default value associated with a greater priority weight in the hierarchical model depending on the priority or importance of the parameter in grading a product. In some embodiments, grading system 330 may modify a hierarchical model based on the results of a validation test performed on real or simulated return product identifiers. Modified hierarchical models may be stored in database 336 as different versions of the hierarchical model.

Figure 4:
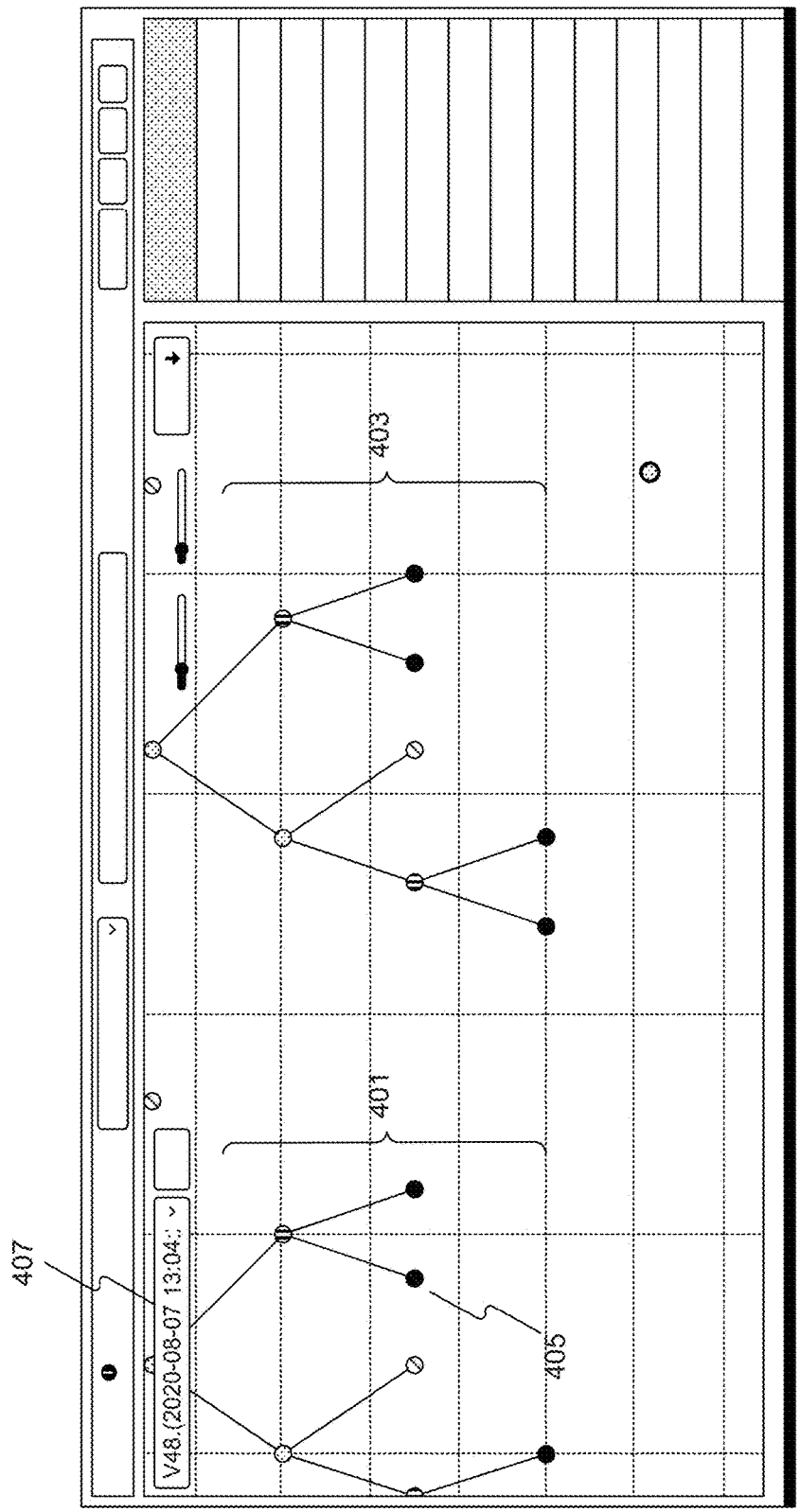
FIG. 4 depicts an exemplary user interface including hierarchical models for grading returned products, consistent with the disclosed embodiments.

Referring to FIG. 4, an exemplary user interface 400 including hierarchical models for grading returned products is shown. As illustrated in FIG. 4, grading system 330 may generate hierarchical models 401 and 403 based on a return product identifier. In some embodiments, user 320A may generate or modify hierarchical models 401 or 403 via an internal user device (e.g., user device 320). In some embodiments, grading system 330 may generate hierarchical models 401 or 403 by determining a hierarchy of parameters associated with a product based on the return product identifier. For example, the parameters may include one or more of product price, product category, expiration date of product, customer relationship with vendor of product, product damage, or type of fulfillment center that received the product. In some embodiments, grading system 330 may arrange a plurality of data structures 405 based on the hierarchy of parameters to generate hierarchical models 401 or 403.

In some embodiments, an internal user may generate or modify hierarchical models 401 or 403 via internal front end system 105. In some embodiments, grading system 330 may track different versions 407 of hierarchical models 401 or 403. In some embodiments, internal users or grading system 330 may choose hierarchical models 401 or 403 to validate or implement on real-time products by choosing or modifying version 407 of hierarchical models 401 or 403. For example, the types of parameters, number of parameters, or distances between data structures (or nodes) 405 in hierarchical model 401 or 403 may be modified. In some embodiments, new parameters may be generated by grading system 330. In some embodiments, default values may be generated, modified, or assigned to parameters. For example, some parameters may have a default value associated with a greater priority weight in hierarchical models 401 or 403 depending on the priority or importance of the parameter in grading a product. In some embodiments, grading system 330 may modify hierarchical models 401 or 403 based on the results of a validation test performed on real or simulated return product identifiers. Modified hierarchical models may be stored in database 336 as different versions 407 of hierarchical models 401 or 403.

Figure 5:
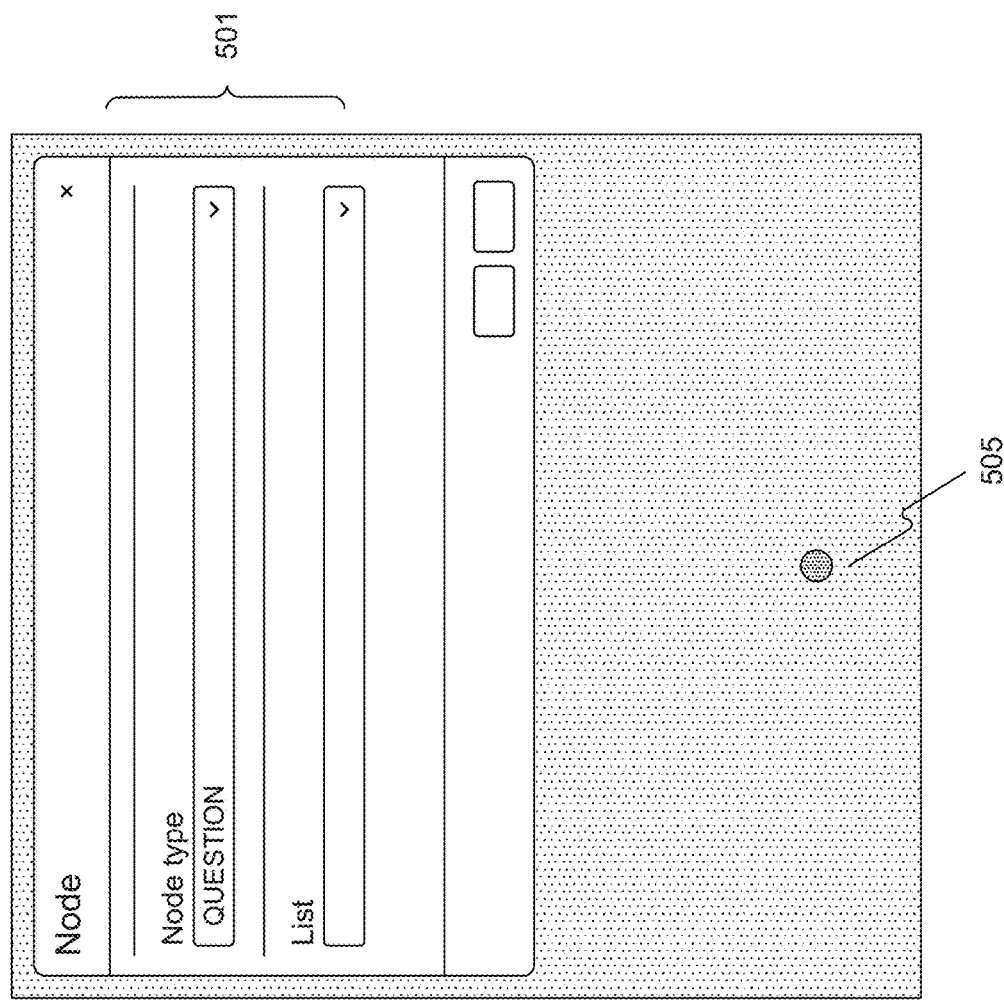
FIG. 5 depicts an exemplary user interface for interacting with a grading system, consistent with the disclosed embodiments.

Referring to FIG. 5, an exemplary user interface 500 for interacting with grading system 330 is shown. As illustrated in FIG. 5, grading system 330 may generate one or more nodes 505. The sequence and number of nodes may vary based on the hierarchical model or return product identifier. In some embodiments, grading system 330 may modify a hierarchical model by modifying at least one node 505 or branch connection between two nodes based on a determination that a determined price or product condition do not pass validation tests. In some embodiments, an internal user may generate or modify the hierarchical model via internal front end system 105 by using interface element 501 to create a prompt or associate parameters with node 505. For example, the types of parameters, number of parameters, or distances between nodes 505 in the hierarchical model may be modified. In some embodiments, new parameters may be generated by grading system 330. In some embodiments, default values may be generated, modified, or assigned to parameters. Modified hierarchical models may be stored in database 336 as different versions of the hierarchical model.

Figure 6:
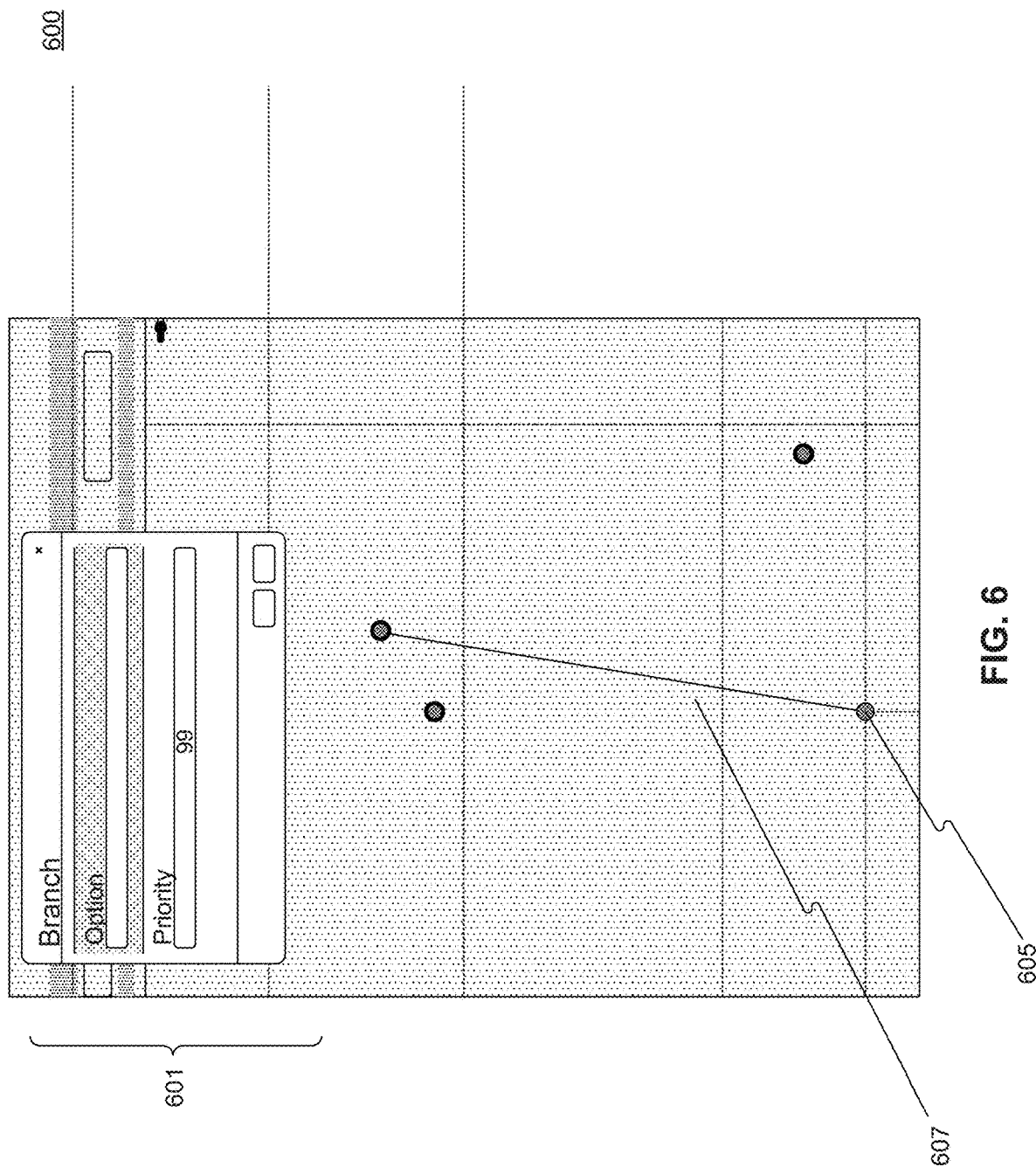
FIG. 6 depicts an exemplary user interface for interacting with a grading system, consistent with the disclosed embodiments.

Referring to FIG. 6, an exemplary user interface 600 for interacting with grading system 330 is shown. As illustrated in FIG. 6, grading system 330 may generate a hierarchical model based on the return product identifier. In some embodiments, user 320A may generate or modify a hierarchical model via an internal user device (e.g., user device 320). In some embodiments, grading system 330 may generate a hierarchical model by determining a hierarchy of parameters associated with a product based on the return product identifier. For example, the parameters may include one or more of product price, product category, expiration date of product, customer relationship with vendor of product, product damage, or type of fulfillment center that received the product. In some embodiments, grading system 330 may arrange a plurality of nodes 605 based on the hierarchy of parameters to generate the hierarchical model. In some embodiments, grading system 330 may modify the hierarchical model by modifying at least one node 605 or branch connection 607 between two nodes. For example, the types of parameters, number of parameters, or distances between nodes in the hierarchical model may be modified. In some embodiments, new parameters may be generated by grading system 330. In some embodiments, default values may be generated, modified, or assigned to parameters. For example, some parameters may have a default value associated with a greater priority weight in the hierarchical model depending on the priority or importance of the parameter in grading a product. In some embodiments, user 320A or grading system 330 may modify or assign a priority weight using interface element 601.

Figure 7:
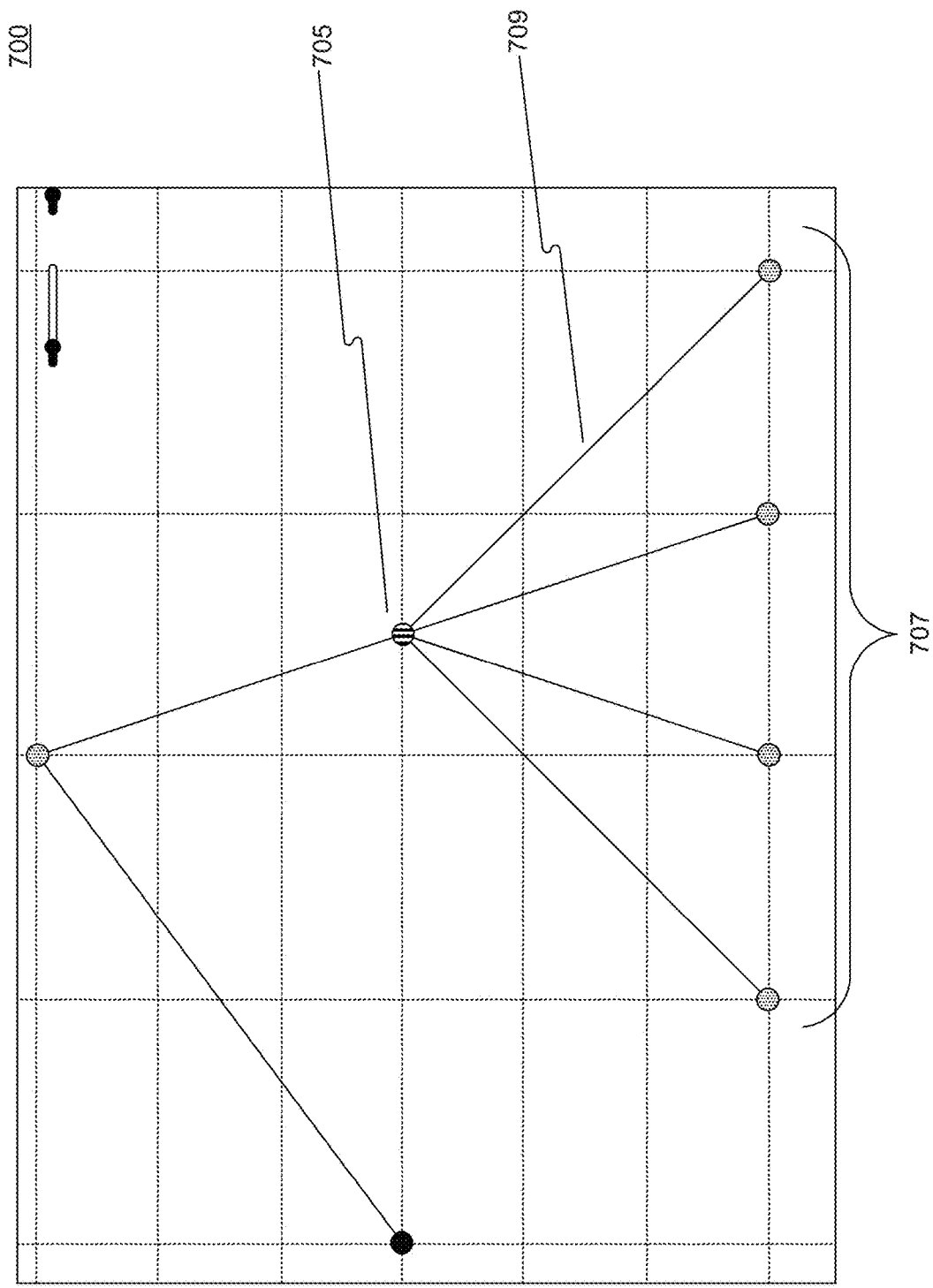
FIG. 7 depicts an exemplary hierarchical model for grading returned products, consistent with the disclosed embodiments.

Referring to FIG. 7, an exemplary user interface 700 for interacting with grading system 330 is shown. As illustrated in FIG. 7, an agent may sequentially traverse a plurality of nodes 705 or 707. In some embodiments, the agent may traverse a plurality of data structures that may be API nodes or classification nodes. In some embodiments, grading system 330 may generate one or more API nodes or classification nodes. The sequence and number of nodes may vary based on the hierarchical model or return product identifier. In some embodiments, one or more classification nodes 707 that are dependent on an API node 705 may populate the hierarchical model when API node 705 is generated. In some embodiments, classification nodes 707 that are dependent on API node 705 may populate when a worker device scans an indicia (e.g., a barcode, an image, a text string, an RFID tag, etc.) of a product.

In some embodiments, API node 705 or classification node 707 may include a prompt requesting an original price of a product. Classification node 707 may include at least one branch 709 leading to subsequent node 707. For example, the agent may follow branch 709 to traverse subsequent node 707 if the original price is greater than a threshold price. In some embodiments, the agent may follow 709 branch to traverse subsequent node 705 if the original price is less than a threshold price. In some embodiments, the agent may follow branch 709 to traverse subsequent node 705 if there is no original price or if a default price is submitted. Grading system 330 may modify database 336 to assign, to the return product identifier, the response associated with API node 705 or submitted by user 320A for classification node 707. Based on the response, the agent may traverse a subsequent node in the hierarchical model until the agent reaches a final node.

Figure 8:
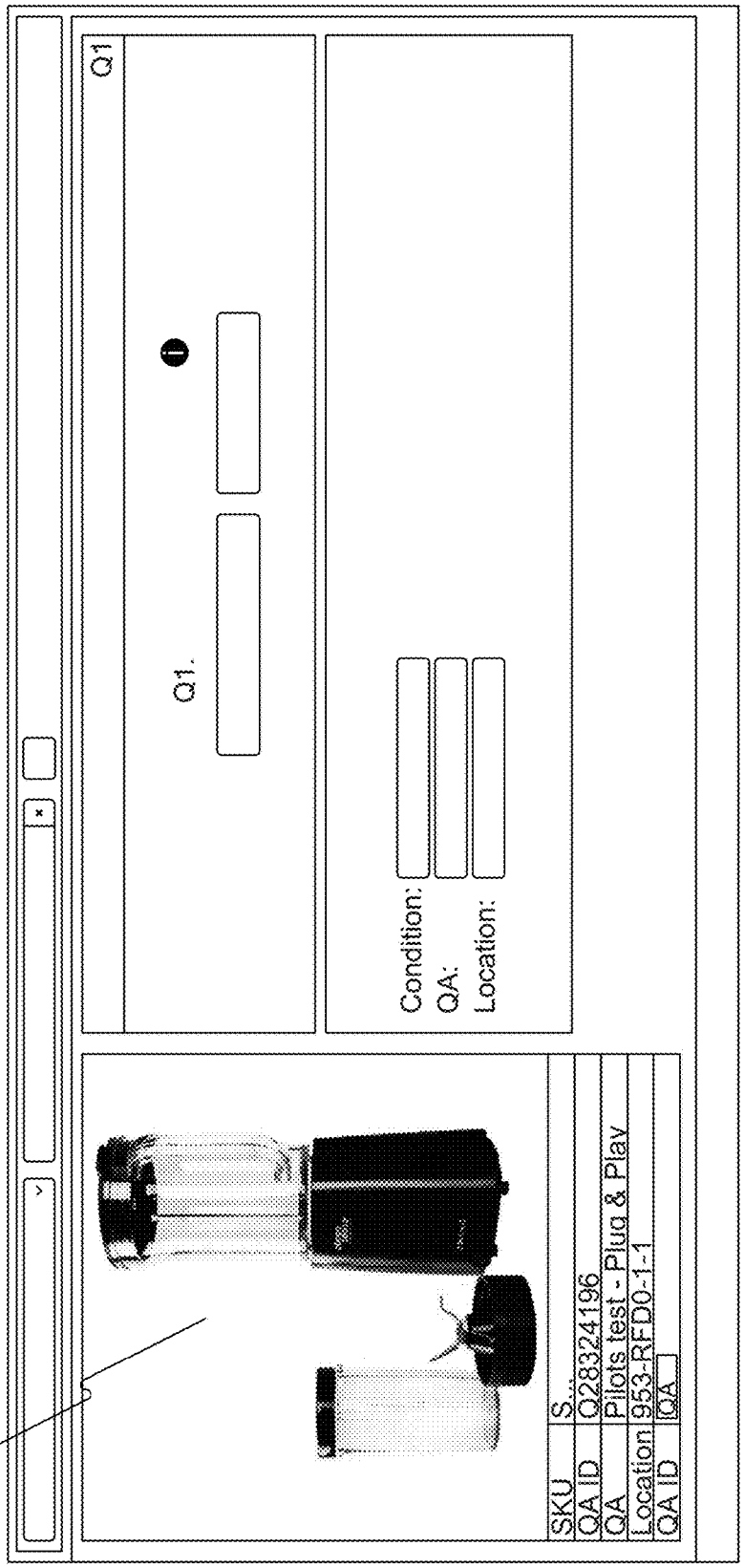
FIG. 8 depicts an exemplary user interface for interacting with a grading system, consistent with the disclosed embodiments.
Figure 9:
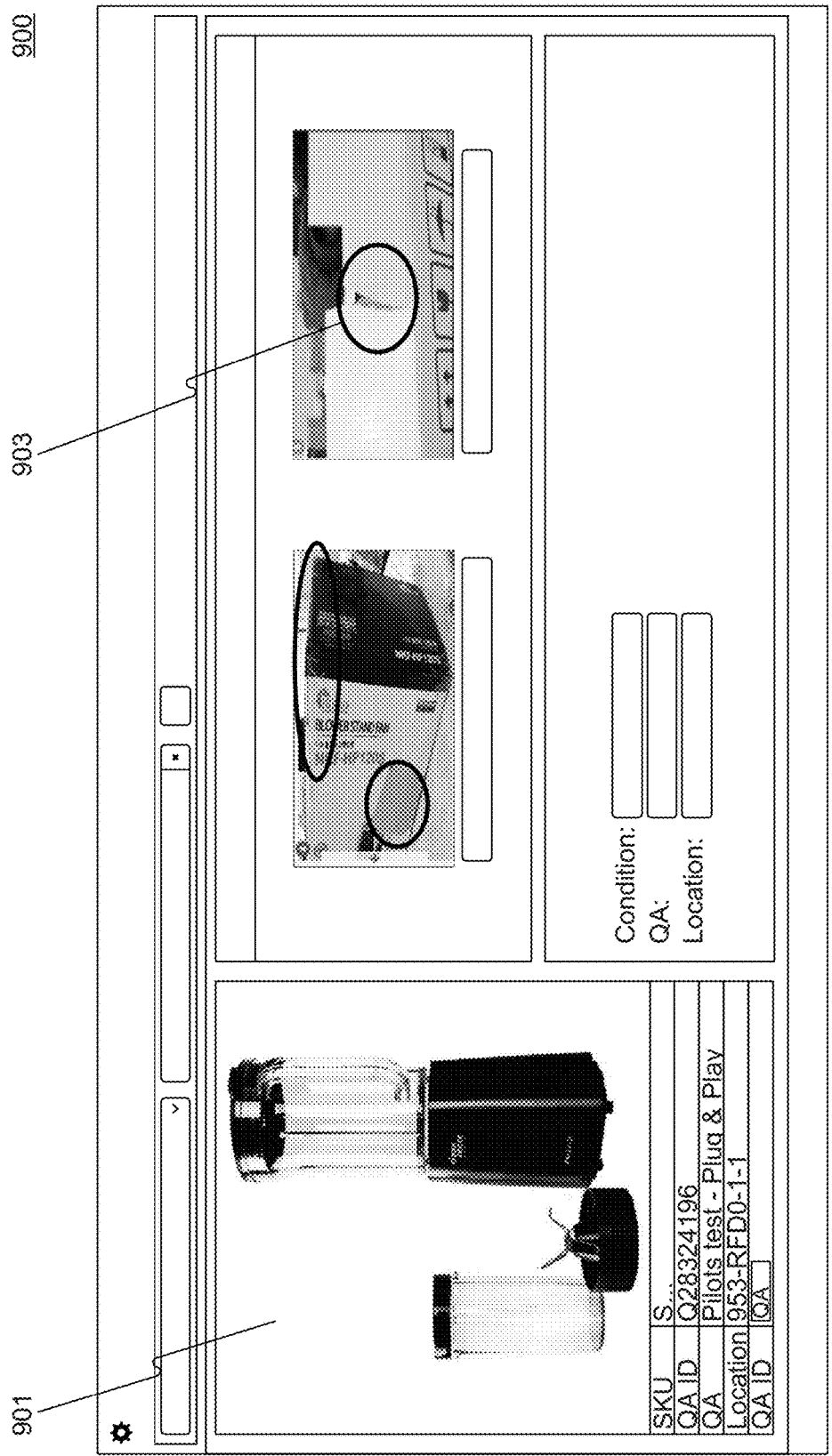
FIG. 9 depicts an exemplary user interface for interacting with a grading system, consistent with the disclosed embodiments.

Referring to FIGS. 8 and 9, exemplary user interfaces 800 and 900 for interacting with grading system 330 are shown. For example, grading system 330 may transmit a prompt that requests the physical state of the product. The prompt may offer one or more options, such as "no marks or blemishes," "blemish," "mark or scratch on package," "heavily damaged," etc. User 320A may submit one of the options offered by the prompt as response via user device 320. Grading system 330 may modify database 336 to assign, to the return product identifier, the response submitted by user 320A. Based on the response submitted by user 320A, the agent may traverse a subsequent node in the hierarchical model. In some embodiments, the subsequent node traversed may depend on the response submitted by user 320A. For example, if user 320A submits a response "blemish," then the subsequent node traversed may transmit a prompt that requests an indication of whether the blemishes may be removed from the product. User 320A may submit a response "yes" or "no" via user device 320. Grading system 330 may modify database 336 to assign, to the return product identifier, the response submitted by user 320A. Based on the response submitted by user 320A, the agent may traverse a subsequent node in the hierarchical model until the agent reaches a final node. For example, the final node may indicate a product's condition (e.g., the package of the product is unopened, new, repackaged, package damaged, refurbished, used best, used good, or used normal) or a type of material of the product (e.g., where the type of material of a product may indicate a recycling process for the product).

In some embodiments, if user 320A submits a response "mark or scratch on package," then the subsequent node traversed may be an API node at which grading system 330 may retrieve at least one image 901 of the product associated with the return product identifier and at least one image 801 of the product as advertised from database 336. In some embodiments, if user 320A submits a response "mark or scratch on package," then the subsequent node traversed may be an API node at which grading system 330 may retrieve at least one image 801 of the product as advertised from database 336 and the node traversed after the API node may be a classification node at which grading system 330 may transmit a prompt that requests at least one image 901 of the product associated with the return product identifier from user 320A. In some embodiments, grading system 330 may retrieve at least one image 801 of the product as advertised without retrieving or receiving any images of the product associated with the return product identifier.

In some embodiments, when at least one image 801 of the product as advertised is retrieved, grading system 330 may transmit a prompt to user device 320 that requests an indication of whether the package of the product is more or less damaged than shown in the at least one image of the product as advertised at a subsequent node traversed. In some embodiments, grading system 330 may transmit a request to user device 320 to inspect the product. In some embodiments, grading system 330 may transmit a request to user device 320 to inspect at least one image 901 of the product associated with the return product identifier. In some embodiments, grading system 330 may provide, for presentation via user device 320, a user interface that includes the request to inspect the product. In some embodiments, grading system 330 may provide, for presentation via user device 320, a user interface that includes at least one image 901 of the product or at least one image 801 of the product as advertised. In some embodiments, the user interface may include a selectable interface element for inspecting at least one image of the product as compared to at least one image of the product as advertised.

In some embodiments, user 320A may submit a response including "more," "less," or "same" based on a marking 903 via user device 320. For example, grading system 330 may receive, from user device 320, an indication that the product is more damaged than depicted in the at least one image 801 of the product as advertised, an indication that the product is less damaged than depicted in the at least one image 801 of the product as advertised, or an indication that the product is in a condition similar to or the same as depicted in the at least one image 801 of the product as advertised. Grading system 330 may modify database 336 to assign, to the return product identifier, the response submitted by user 320A. Based on the response submitted by user 320A, the agent may traverse a subsequent node in the hierarchical model until the agent reaches a final node.

In some embodiments, grading system 330 may determine that a product condition is severely damaged (e.g., based on a response submitted by user 320A) and that the product is salvageable based on historical data stored in database 336. Grading system 330 may modify database 336 to assign responses to at least one node to the return product identifier, wherein the assigned responses indicate that the product is salvageable. In some embodiments, grading system 330 may determine that a product condition is severely damaged (e.g., based on a response submitted by user 320A) and that the product is not salvageable based on historical data stored in database 336. Grading system 330 may modify database 336 to assign responses to at least one node to the return product identifier, wherein the assigned responses indicate that the product is not salvageable.

Figure 10:
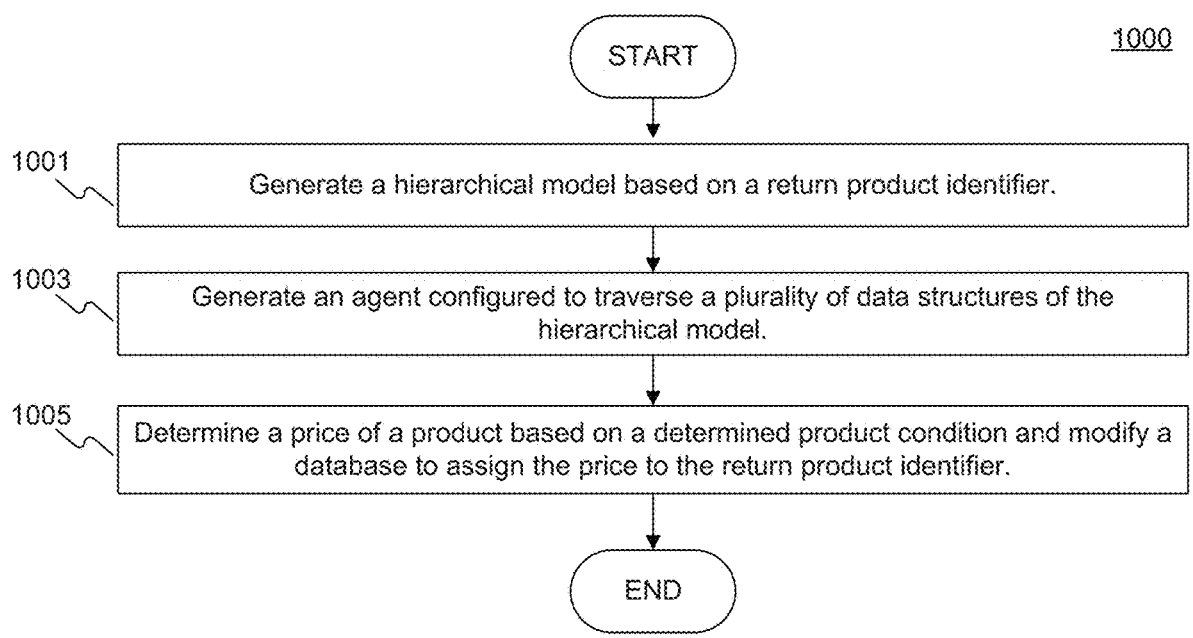
FIG. 10 depicts an exemplary process for managing inventory by grading returned products, consistent with the disclosed embodiments.

Referring to FIG. 10, a process 1000 for managing inventory by grading returned products is shown. While in some embodiments grading system 330 may perform several of the steps described herein, other implementations are possible. For example, any of the systems and components (e.g., system 100) described and illustrated herein may perform the steps described in this disclosure.

In step 1001, grading system 330 may receive a return product identifier and a request for grading a product from user device 320 associated with user 320A. In some embodiments, a request for grading a product may be automatically transmitted to grading system 330 when user device 320 scans an indicia of the product. Grading system 330 may generate a hierarchical model based on the return product identifier. In some embodiments, user 320A may generate or modify a hierarchical model via an internal user device (e.g., user device 320). In some embodiments, grading system 330 may generate a hierarchical model by determining a hierarchy of parameters associated with a product based on the return product identifier. For example, the parameters may include one or more of product price, product category, expiration date of product, customer relationship with vendor of product, product damage, extent or degree of product damage, whether the product should be scrapped, whether a user changed their mind regarding a product, whether the product has defects, whether a user wants to exchange a product, manufacturer, SKU identification, whether the product is fresh food, type of fulfillment center that received the product, audit category, etc. In some embodiments, grading system 330 may arrange a plurality of data structures based on the hierarchy of parameters to generate the hierarchical model.

In step 1003, grading system 330 may generate an agent configured to traverse the plurality of data structures of the hierarchical model. For example, an agent may be software including functions or methods configured to perform actions for traversing a plurality of data structures. The hierarchical model may include a plurality of data structures, where the data structures may be API nodes. At API nodes, grading system 330 may prompt a worker (e.g., user 320A) associated with a worker device (e.g., user device 320) to scan, via the worker device, an indicia of a product. Grading system 330 may search database 336 for product information associated with the product based on the scanned indicia and identify the product information associated with the product. In some embodiments, grading system 330 may retrieve at least one first prompt from database 336 based on the product information and modify database 336 to assign, to the return product identifier, at least one response to the first prompt based on the scanned indicia.

In some embodiments, the agent may sequentially traverse a plurality of API nodes. In some embodiments, the agent may traverse a plurality of data structures that may be classification nodes. In some embodiments, grading system 330 may generate one or more classification nodes. The sequence and number of nodes may vary based on the hierarchical model or return product identifier. In some embodiments, one or more classification nodes that are dependent on an API node may populate the hierarchical model when the API node is generated. In some embodiments, classification nodes that are dependent on the API node may populate when a worker device scans an indicia of a product.

For example, at a classification node, grading system 330 may retrieve at least one prompt conditional decision prompt from database 336 based on the product information associated with the product. In some embodiments, grading system 330 may prompt a worker associated with a worker device to scan, via the worker device, an indicia of the product. Grading system 330 may search database 336 for product information associated with the product based on the scanned indicia and identify the product information associated with the product. Grading system 330 may retrieve at least one prompt from database 336 based on the product information associated with the product. In some embodiments, grading system 330 may transmit the prompt to the worker device. User 320A may submit via user device 320 at least one response to the prompt. Grading system 330 may modify database 336 to assign, to the return product identifier, at least one response submitted by user 320A.

In step 1005, grading system 330 may generate a node at which a product condition associated with the product may be determined. A product condition may include unopened, new, repackaged, package damaged, refurbished, used best, used good, or used normal. In some embodiments, the node may be a final node that is traversed by the agent after the agent traverses all API nodes or classification nodes in the hierarchical model. In some embodiments, grading system 330 may automatically determine the product condition when the agent is triggered by a preceding node to traverse the final node. For example, the agent may automatically traverse the final node when user 320A submits at least one response to the prompt associated with a classification node. In some embodiments, grading system 330 may assign the product condition to the return product identifier.

In some embodiments, grading system 330 may transmit the determined product condition to a price determination system and the price determination system may determine a price of the product based on the product condition. In some embodiments, grading system 330 may determine a price of the product based on the product condition. Grading system 330 may modify database 336 to assign the price to the return product identifier and transmit a notification to user device 320 to resell the returned product at the determined price. Grading system 330 may provide a user interface that includes the notification for presentation via user device 320.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for managing inventory by grading returned products, comprising:
one or more memory devices storing instructions; and
one or more processors configured to execute the instructions to perform operations comprising:
generating a hierarchical model based on a return product identifier;
traversing, via an agent, a plurality of data structures of the hierarchical model by:
at a first data structure:
assigning, to the return product identifier, at least one response to a first prompt based on a scanned indicia of a product;
at a second data structure:
assigning, to the return product identifier, at least one response to a second prompt;
at a third data structure:
assigning a product condition to the return product identifier;
determining a price of the product based on the product condition;
assigning a price, based on the product condition, to the return product identifier; and
providing, for presentation via a user device, a user interface that includes a notification to resell the product at the determined price.

2. The computer-implemented system of claim 1, wherein the operations further comprise:
determining a hierarchy of parameters associated with the product based on the return product identifier; and
arranging the plurality of data structures based on the hierarchy of parameters.

3. The computer-implemented system of claim 2, wherein the parameters comprise at least one of product price, product category, expiration date of product, customer relationship with vendor of product, product damage, or type of fulfillment center that received the product.

4. The computer-implemented system of claim 1, wherein the operations further comprise receiving at least one image of the product associated with the return product identifier and at least one image of the product as advertised.

5. The computer-implemented system of claim 4, wherein the operations further comprise:
transmitting a request, to a user device, to inspect the at least one image of the product.

6. The computer-implemented system of claim 5, wherein the operations further comprise providing a user interface comprising a selectable interface element for inspecting the at least one image of the product.

7. The computer-implemented system of claim 6, wherein the operations further comprise:
assigning an indication that the product is more damaged than depicted in the at least one image of the product to the return product identifier.

8. The computer-implemented system of claim 6, wherein the operations further comprise:
assigning an indication that the product is less damaged than depicted in the at least one image of the product to the return product identifier.

9. The computer-implemented system of claim 6, wherein the operations further comprise:
assigning responses to the first data structure and the second data structure to the return product identifier, wherein the assigned responses indicate that the product is salvageable.

10. The computer-implemented system of claim 6, wherein the operations further comprise:
assigning responses to the first data structure and the second data structure to the product identifier, wherein the assigned responses indicate that the product is not salvageable.

11. A computer-implemented method for managing inventory by grading returned products, comprising:
generating a hierarchical model based on a return product identifier;
traversing, via an agent, a plurality of data structures of the hierarchical model by:
at a first data structure:
assigning, to the return product identifier, at least one response to a first prompt based on a scanned indicia of a product;
at a second data structure:
assigning, to the return product identifier, at least one response to a second prompt;
at a third data structure:
assigning a product condition to the return product identifier;
determining a price of the product based on the product condition;
assigning a price, based on the product condition, to the return product identifier;
providing, for presentation via a user device, a user interface that includes a notification to resell the product at the determined price.

12. The computer-implemented method of claim 11, further comprising:
determining a hierarchy of parameters associated with the product based on the return product identifier; and
arranging the plurality of data structures based on the hierarchy of parameters.

13. The computer-implemented method of claim 12, wherein the parameters comprise at least one of product price, product category, expiration date of product, customer relationship with vendor of product, product damage, or type of fulfillment center that received the product.

14. The computer-implemented method of claim 11, further comprising receiving at least one image of the product associated with the return product identifier and at least one image of the product as advertised.

15. The computer-implemented method of claim 14, further comprising:
   transmitting a request, to a user device, to inspect the at least one image of the product.

16. The computer-implemented method of claim 15, further comprising providing a user interface comprising a selectable interface element for inspecting the at least one image of the product.

17. The computer-implemented method of claim 16, further comprising:
   assigning an indication that the product is more damaged than depicted in the at least one image of the product to the return product identifier.

18. The computer-implemented method of claim 16, further comprising:
   assigning an indication that the product is less damaged than depicted in the at least one image of the product to the return product identifier.

19. The computer-implemented method of claim 16, further comprising:
   assigning responses to the first data structure and the second data structure to the return product identifier, wherein the assigned responses indicate that the product is salvageable.

20. The computer-implemented method of claim 16, further comprising:
   assigning responses to the first data structure and the second data structure to the product identifier, wherein the assigned responses indicate that the product is not salvageable.

\* \* \* \* \*